United States Patent [19]

Cossaboon et al.

[11] Patent Number: 5,769,689
[45] Date of Patent: Jun. 23, 1998

[54] COMPOSITIONS AND METHODS FOR POLISHING SILICA, SILICATES, AND SILICON NITRIDE

[75] Inventors: David Cossaboon, Christiana; Jiun-Fang Wang, Hockessin, both of Del.; Lee Melbourne Cook, Steelville, Pa.

[73] Assignee: Rodel, Inc., Newark, Del.

[21] Appl. No.: 608,287

[22] Filed: Feb. 28, 1996

[51] Int. Cl.$^6$ .................................................. B24B 1/00
[52] U.S. Cl. .............................. 451/41; 51/308; 106/3; 451/36
[58] Field of Search ..................... 451/41, 36; 51/308; 106/3; 510/175

[56] References Cited

U.S. PATENT DOCUMENTS

| | | | |
|---|---|---|---|
| 4,169,337 | 10/1979 | Payne | 51/283 R |
| 4,462,188 | 7/1984 | Payne | 51/283 R |
| 4,956,015 | 9/1990 | Okajima et al. | 106/3 |
| 4,983,650 | 1/1991 | Sasaki | 524/27 |
| 5,230,833 | 7/1993 | Romberger et al. | 252/363.5 |
| 5,244,534 | 9/1993 | Yu et al. | 156/636 |
| 5,352,277 | 10/1994 | Sasaki | 106/6 |
| 5,637,185 | 6/1997 | Murarka et al. | 438/5 |

OTHER PUBLICATIONS

Hayashi et al., "Ammoniom–Salt–Added Silica Slurry for CMP of the Interlayer Dielectric Film Planarization in ULSI's", Jpn. J. Appl. Phys., vol. 34, pp. 1037–1042, 1995.
L. Cook, "Chemical Processes in Glass Polishing," J. Non–Cryst. Solids, 120, pp. 156–165, 1990.

*Primary Examiner*—Robert A. Rose
*Attorney, Agent, or Firm*—Kenneth A. Benson

[57] ABSTRACT

A composition is provided, which is suitable for polishing $SiO_2$, silicates, and silicon nitride, comprising an aqueous slurry of submicron $SiO_2$ particles and a soluble inorganic salt or combination of soluble inorganic salts of total solution concentration below the critical coagulation concentration for the slurry, wherein the slurry pH is adjusted to within the range of about 9 to 10 by addition of a soluble amine or mixture of soluble amines. Optionally, the compositions of this invention may also comprise a polyhydric alcohol.

18 Claims, No Drawings

COMPOSITIONS AND METHODS FOR POLISHING SILICA, SILICATES, AND SILICON NITRIDE

BACKGROUND OF THE INVENTION

1. Field of the Invention

The present invention relates to compositions which are useful as slurries used during the chemical mechanical polishing of substrates, especially those comprised of silica, silicates or silicon nitride.

2. Description of Related Art

During the chemical-mechanical polishing (CMP) of interlayer dielectrics used in the manufacture of integrated circuits a slurry is used in conjunction with a polishing pad to facilitate the removal of an insulator or dielectric material. In most CMP applications this insulating or dielectric material is $SiO_2$, In an aqueous environment the surface undergoes a hydration reaction with $H_2O$ to produce a surface network of hydroxylated Si molecules. Dissolution of this network generally occurs above a pH of 9.0 because of the solubility of the reaction product at high pH. The polishing rate of silica and silicates generally parallels the corrosion process, i.e. a high pH is desirable to achieve a high removal rate. Silicon Nitride, while chemically dissimilar to silica, has shown generally similar polishing behavior. This has been attributed to formation of a silicate corrosion layer on exposure to aqueous solutions. Thus, formulations shown to be suitable for the polishing of silica are also effective for silicon nitride, albeit at lower rates. To achieve this high pH, bases such as KOH and $NH_4OH$ are used to yield a pH of 10–11 in commercial production of polishing slurries useful for CMP of insulating layers.

For example, Yu et al. in U.S. Pat. No. 5,244,534 describe a CMP step for removing insulation material from around a metal plug. To remove an oxide insulation material such as $SiO_2$, they describe the use of a colloidal silica slurry containing etchants selective to the oxide, such as a basic mixture of $H_2O$ and KOH. (col.4, lines 59–64)

There are disadvantages to the use of potassium and ammonium hydroxides in slurries used for the removal of insulating materials. Light alkali metal ions, especially sodium and potassium ions, diffuse into the insulating oxide layer thereby contaminating it. Thus they are generally avoided in slurries used with semiconductor devices. Ammonium hydroxide has a tendency to decompose so that there is an odor of free ammonia in slurries where this compound is used. Vapors of ammonia and amines can be harmful to other semiconductor process steps, particularly their damaging effects on photoresist materials. In consequence, CMP slurries having components with significant vapor pressures are specifically avoided. It would be a significant improvement in the state of the art if light alkali meals and volatile bases such as ammonia could be eliminated from effective slurries.

An additional disadvantage of such prior art slurries is the relatively high pH required for producing acceptably high removal rates. The caustic nature of such highly alkaline solutions represents a potential safety hazard to users and can lead to corrosion of metal components. In consequence, efforts have been made to activate silica slurries at lower pH. For example, Hayashi et al. (Jpn. J. Appl. Phys., Vol 34, pp. 1037–42, 1995) disclose the utility of adding salts to a silica slurry in order to increase the polishing rate. More specifically, ammonium salts were added to a slurry of neutral pH in concentrations ranging from 0.1–0.3 mol/L. After salt addition, pH was adjusted to values ranging from 6 to 9 using unspecified acids or bases. It is believed that ammonium hydroxide was the base used. Salt addition yielded a significant rate enhancement. The enhancement was most pronounced at pH6 and diminished as pH increased. Classical theoretical treatments of the electrical double layer (EDL) of colloidal particles were invoked to explain the effect, i.e., the salts acted to diminish the EDL, which resulted in an acceleration of the polishing rate. This is commonly termed the "salt effect" in colloid science, and has been extensively studied.

One consequence of the salt effect in colloidal dispersions is a coagulation or agglomeration effect. As the EDL thickness decreases, particles which were originally repelled by their charge tend to come together into agglomerates. Indeed Hayashi et al. observed this effect in their test slurries and cited the agglomeration as a contributor to observed rate increases. Unfortunately, agglomeration is highly undesirable in commercially produced slurries as it leads to sedimentation and caking on the bottom of the container. This seriously interferes with the users ability to transfer the slurry into distribution systems, and has furthermore been cited as a source of damaging large particulates. In consequence, none of the commercially available silica-based slurries known to the inventors exhibits agglomeration effects. Accordingly, it would be highly desirable if additions of salts to CMP slurries for the purposes of rate enhancement could be effected without said coagulation effects.

Other types of bases, particularly amines, have also been used to control pH in slurries in order to produce a slurry free from ammonia and light alkali metals. Such slurries, typified by formulations disclosed to Payne (U.S. Pat. No. 4,169,337 and 4,462,188) have been shown to exhibit high removal rates when used to polish single crystal silicon. However, they exhibit virtually no polishing activity when used on $SiO_2$. This lack of activity of amine-based slurries on $SiO_2$ is well known in the art and is deliberately employed for device processes which require such high differences in rate, e.g. polysilicon trench isolation.

Payne in U.S. Pat. No. 4,462,188 also shows the addition of quaternary ammonium salts to the slurries with colloidal silica and water soluble amines to enhance the polishing of silicon. Again, such slurries produce little or no removal so that quaternary ammonium salts and organic salts in general are not effective for removal of insulation layers. Furthermore, Payne shows the use of NaOH for pH adjustment which would be most undesirable for use on an insulation surface.

From the above, it is apparent that if a slurry for polishing $SiO_2$, free from light alkali metals and ammonia, could be prepared which exhibited desirably high polishing rates and freedom from coagulation effects, it would represent a significant advancement in the state of the art.

Accordingly, it is an object of this invention to provide a slurry which is capable of insulation layer removal at high and effective rates while using amines together with an inorganic salt at a concentration well below the level resulting in slurry particle coagulation to provide the necessary pH control of the slurry.

It is a further object of this invention to provide a method for polishing the insulation layer of integrated circuit wafers using a polishing slurry which uses amines together with a salt at a concentration well below the level resulting in slurry particle coagulation to control the pH of the polishing slurry.

SUMMARY OF THE INVENTION

A composition is provided, suitable for polishing $SiO_2$, silicates, and silicon nitride, comprising an aqueous slurry of submicron SiO$_2$ particles and a soluble inorganic salt or combination of soluble inorganic salts of total solution concentration below the critical coagulation concentration for the slurry, wherein the slurry pH is adjusted to within the range of about 9 to 10 by addition of a soluble amine or mixture of soluble amines. Optionally, the compositions of this invention may also comprise a polyhydric alcohol. A further aspect of the present invention is a process for polishing SiO$_2$, silicates, or silicon nitride in which the slurry used in combination with standard polishing machines and polishing pads is comprised of an aqueous slurry of submicron SiO$_2$ particles and a soluble inorganic salt or combination of soluble inorganic salts of total solution concentration below the critical coagulation concentration for the slurry, wherein the slurry pH is adjusted to within the range of about 9 to 10 by addition of a soluble amine or mixture of soluble amines. Optionally, the slurries used in the process also comprise a polyhydric alcohol.

DETAILED DESCRIPTION OF THE INVENTION

A key aspect of slurries of the present invention is the unexpected synergistic combination of amines and water soluble salts in low concentration, typically between 0.01 and about 1.0 percent by weight. As will be clearly shown in the examples below, incorporation of amines by themselves results in a slurry with essentially no polishing activity toward SiO$_2$ and silicates. Simple additions of the salts themselves, with no amine additions, are expected to behave according to the teachings of Hayashi et al.

More surprisingly, this synergistic effect is found to be specific to a relatively narrow range of solution pH values. The pH dependence of this effect is considerably different from that taught by Hayashi et al. for higher salt concentrations in a non-amine medium.

Amines incorporated into polishing slurries via prior art recipes are thought to yield an amine adsorption complex on the hydroxylated surface of the silica substrate which inhibits the polishing process. This amine complex is believed to inhibit dissolution of the reaction product, Si(OH)$_4$, thus inhibiting the polishing rate. The addition of an inorganic salt to the slurry effectively breaks the amine's bond to the wafer surface, thereby allowing the hydroxylated surface molecules to be reexposed and allow surface removal. This has been shown to occur over a very specific pH range. The narrow and specific pH range over which this synergistic effect occurs is one of the unexpected features of slurries of the present invention. The pH range of effectiveness closely brackets the range of 50% dissociation of Si—OH groups on the silica surface (see L. Cook, J. NonCryst. Solids, 120, pp. 156–165, 1990).

A wide variety of water soluble inorganic salts have been shown to be effective accelerants in slurries of the present invention. Salts of single valent cations, such as CsNO$_3$, have proved to be effective at concentrations in the slurry of up to about 1% by weight. Salts of divalent cations, such as Ba(NO$_3$)$_2$, are effective at very low concentrations, such as about 0.05% by weight. Any other monovalent, divalent, trivalent, or higher valent cation may be employed in the form of an inorganic salt so long as the salt is water soluble and its concentration in the slurry is below the point which produces coagulation effects. This concentration is generally referred to as the Critical Coagulation Concentration (CCC), and is defined herein as the lowest salt concentration which produces noticeable coagulation and sedimentation of an initially uniform slurry dispersion.

The CCC varies with the specific cation used, and more specifically, with the valence (Z), ionic radius (R), and the ratio of the charge to the ionic radius (Z/R). Generally the CCC varies inversely with Z/R. Thus, for example, salts with monovalent cations, such as Na$^+$, K$^+$, or Cs$^+$ have a significantly higher CCC than those with divalent cations, such as Ba$^{2+}$. Within the alkali family, Cs has the lowest Z/R; thus the ranking of CCC is Na$^+$<K$^+$<Cs$^+$. For all practical purposes, the upper range of salt concentration useful in the present invention is set by the salt with the highest CCC. This is generally the alkali salt series. A level of up to about 1% by weight is generally found to be safe. Accordingly, this represents the upper limit of salt incorporation in the Examples below.

The choice of an appropriate activating salt is determined by the intended use of the slurry. For semiconductor processing applications, the use of salts whose cations would be considered to be a contaminant would be avoided. Thus, transition metal salts (e.g. with cations of Fe$^{3+}$, Cu$^{2+}$, Ni$^{2+}$, etc.) would be avoided, although they would prove effective in activating the slurry. In like fashion, light alkali elements, especially Na$^+$ and K$^+$, while effective in accelerating the polishing rate, would also be avoided. For other less critical applications, such as the polishing of spectacle lenses, etc. these salts could be used with effectiveness. For semiconductor applications salts of the NH$_4^+$, Cs$^+$, and Ba$^{2+}$ cations are preferred.

The CCC for any slurry formulation can be readily determined by preparing a sample and observing the effects of salt addition on the particle size distribution and the rate of sedimentation, which is due to coagulation effects. Slurries of the present invention utilize salt additions in concentrations well below the CCC. Thus, no agglomeration or sedimentation effects will be observed.

To further counteract destabilization effects, particularly at elevated temperatures sometimes encountered in shipping or handling, polyhydric alcohols (polyols) can be used to increase the stability of the colloidal slurry as well as to reduce friction between the pad and the wafer surface. Polyhydric alcohols, such as glycerin, polyvinyl alcohol, ethylene glycol, and propylene glycol, are effective in the range of about 300 to 2000 ppm in the slurries of this invention to increase of the colloidal slurries even at temperatures up to about 120° F.

A wide variety of water soluble amines are suitable for use in this invention, such as monoethanolamime, aninoethylethanolamine, etc. As with cations, the choice of amine is dictated by the intended application. Generally amines with low vapor pressure, such as monoethanolamime, are preferred for semiconductor applications because of their low vapor pressure and lack of odor.

A wide variety of silica dispersions are suitable for use in slurries of the present invention. These include dispersions of fumed silica, silicas derived from polymerization of metallo-organic precursors such as tetraethoxyorthosilane (TEOS), and silicas grown from supersaturated solutions of inorganic silicate starting materials. Silica particle sizes and solution concentrations may be selected over any range desired, generally consistent with prior art teachings for polishing applications.

The following examples will further clarify the essential features of the present invention and further distinguish it from prior art.

EXAMPLE 1

This example illustrates the lack of effectiveness of amine additions as taught by Payne (U.S. Pat. No. 4,169,337).

In this example, 150 mm thermal oxide wafers having a surface layer of 1.5 microns of $SiO_2$ were polished on a Westech 372U Polishing Machine under the following conditions: polishing pad, IC1000P/Suba IV (Rodel, Inc.); pad temperature, 99° F.; backing film, DF200 (Rodel, Inc.); polishing time, 2 min; downforce, 7 psi; spindle rpm, 30; platen rpm, 35; back pressure, 2 lbs; oscillation, 10 mm/2 sec; slurry flow rate; 125 ml/min. Conditioning of the polishing pad was carried out between the polishing of each wafer using the conditioner supplied with the Westech 372U Polishing Machine under the following conditions: sweeps between wafers, 2; sweep time, 30 sec; conditioner down force, 2.3 psi; platen rpm, 70; conditioner rpm, 75.

The slurries used contained 13% fumed silica. The pH of the slurry was adjusted by the addition of monoethanolamime. No salt additions were made to the slurry.

Results for polishing the thermal oxide wafers are shown in Table 1 below. The average removal rate shown for each pH is an average for five thermal oxide wafers.

TABLE 1

| pH | Average removal rate (Angstroms/min) |
|---|---|
| 7.0 | 127 |
| 9.6 | 179 |
| 11.0 | 143 |

It is obvious from these results that the slurries described by Payne (U.S. Pat. No. 4,169,337) for polishing silicon wafers are not effective for removal of $SiO_2$ from wafers.

EXAMPLE 2

In this example, 150 mm thermal oxide wafers were polished using the same equipment and conditions as described in Example 1 but with slurries having a composition of the present invention. As in Example 1, the slurries used contained 13% by weight fumed silica and the pH of the slurry was adjusted by the addition of monoethanolamime. In accordance with the teachings of the present invention, 0.8 weight percent ammonium nitrate was added to the slurry formulation.

This concentration is well below the CCC. No measurable coagulation or sedimentation was observed. The concentration of salt is ~0.09 M/L, nearly equivalent to the lowest salt concentration disclosed by Hayashi et al. Again, the average removal rate shown for each pH is an average for five thermal oxide wafers.

TABLE 2

| pH | Average removal rate (Angstroms/min) |
|---|---|
| 9.0 | 250 |
| 9.2 | 600 |
| 9.5 | 1650 |
| 9.6 | 2120 |
| 9.8 | 1300 |
| 10.0 | 690 |
| 10.2 | 230 |
| 10.5 | 50 |

A significant acceleration in polishing rate was observed over a relatively narrow pH range. This behavior is quite different from that reported by Hayashi et al., where a maximum rate was observed at pH 6, with rate reducing continuously with increasing pH. The rates obtained at the optimal pH in this example were significantly higher than observed for commercially obtainable slurries of higher pH (e.g., 1500 A/min for Rodel ILD1300 slurry, pH 11). It is obvious from these data that the effective range of pH when using 0.8 weight percent of ammonium nitrate in the slurry under the above mentioned polishing conditions is from about 9.2 to about 10.0 and that the optimum pH is about 9.6.

EXAMPLE 3

This example illustrates the lack of effect of organic quaternary ammonium salts as taught by Payne (U.S. Pat. No. 4,462,188). Again thermal oxide wafers were polished using the equipment and conditions as set forth in Example 1. As in Example 1, a slurry was made up with 13% by weight fumed silica and the pH was adjusted to 9.6 by the addition of monoethanolamime. An organic quaternary ammonium salt specifically excluded in the present invention, 0.8 weight percent tetramethyl ammonium nitrate, was also added to the slurry. The polishing of five thermal oxide wafers showed an average removal rate of 30 Angstroms/minute. This extremely low rate is clearly different from the accelerating effects illustrated in Example 2.

EXAMPLE 4

To illustrate the variety of inorganic salts which are specifically usable in the present invention, several tests were carried out using the same conditions as set forth in Example 1. These tests included the use of salts other than ammonium nitrate. Again, slurries were made up with 13 weight percent finned silica and pH adjustment to 9.6 using monoethanolamime. Removal rates indicated below are the average for the polishing of five thermal oxide wafers for each slurry sample.

TABLE 3

| Salt | Salt Concentration (weight %) | Average removal rate (Angstroms/min) |
|---|---|---|
| ammonium carbonate | 0.8 (0.09M) | 1435 |
| cesium nitrate | 0.8 (0.075M) | 1386 |
| barium nitrate | 0.05 (0.005M) | 1647 |
| ammonium nitrate/ barium nitrate | 0.3/0.05 (0.03M/0.005M) | 2312 |
| ammonium nitrate/ cesium nitrate | 0.3/0.5 (0.03M/0.05M) | 1842 |

These results again illustrate the effectiveness of inorganic salts in the slurries of this invention, as well as the enhanced effectiveness of multivalent salts such as barium nitrate. The additional synergistic effects of combinations of salts represents an additional advantage, as considerably less salt needs to be added in combination to yield the desired rate acceleration.

EXAMPLE 5

A linear amine other than monoethanolamime was used for the following test. An aqueous slurry was made with 13 wt. % fumed silica and 0.8 wt. % cesium nitrate which was then adjusted to pH 9.6 by addition of aminoethylethanolamine. The average removal rate for five thermal oxide wafers polished under the conditions stated in Example 1 was 936 Angstroms/minute. While this rate is about half that observed when monoethanolamime is used, it is still high enough to be useful in semiconductor device processing.

EXAMPLE 6

Thermal oxide wafers were polished using the conditions of Example 1 with slurries containing 13 weight percent fumed silica and with the slurry pH adjusted to 9.6 with monoethanolamime. The slurries also contained inorganic salts and polyol stabilizers as shown on Table 4:

TABLE 4

| Stabilizer | Stabilizer conc. (ppm) | Salt | Salt conc. (Wt. %) | Ave. Removal rate (Angstroms/min) |
|---|---|---|---|---|
| polyvinyl alcohol | 2000 | $NH_4NO_3/Ba(NO_3)_2$ | 0.25/0.1 | 927 |
| ethylene glycol | 2000 | $NH_4NO_3/Ba(NO_3)_2$ | 0.25/0.1 | 1516 |
| 1,2-propanediol | 2000 | $NH_4NO_3/Ba(NO_3)_2$ | 0.25/0.1 | 1507 |
| 1,2-propanediol | 2000 | $CsNO_3$ | 0.95 | 1217 |
| 1,2-propanediol | 1000 | $CsNO_3$ | 0.95 | 1609 |
| 1,2-propanediol | 500 | $CsNO_3$ | 0.95 | 1706 |
| 1,3-propanediol | 500 | $CsNO_3$ | 0.75 | 1744 |

The results obtained were fully equivalent to those of previous examples of slurries of the present invention. Moreover, slurry stability was greatly enhanced at high temperatures (>100° F.). The present invention may be embodied in forms other than those shown above so that one should look to the claims below rather than the foregoing specification as indicating the scope of the invention.

We claim:

1. A composition suitable for polishing $SiO_2$, silicates, and silicon nitride comprising: water, submicron $SiO_2$ particles, a soluble inorganic salt at a concentration below the critical coagulation concentration for said composition, wherein the pH of said composition is adjusted to within the range of about 9 to 10 by addition of a soluble amine.

2. A composition of claim 1 wherein said soluble inorganic salt is present at a concentration of about 0.01% to about 1.0%.

3. A composition of claim 2 wherein said soluble inorganic salt contains a cation from the group consisting of $NH_4^+$, $Cs^+$ and $Ba^{2+}$.

4. A composition of claim 1, 2, or 3 also comprising a polyhydric alcohol.

5. A composition of claim 4 wherein said polyhydric alcohol is 1,2 propanediol.

6. A composition of claim 3 comprising about 0.05 weight percent barium nitrate and about 13 weight percent fumed silica, wherein the pH is adjusted to about 9.6 by addition of monoethanolamime.

7. A composition of claim 3 comprising about 0.3 weight percent ammonium nitrate, about 0.05 weight percent barium nitrate and about 13 weight percent fumed silica, wherein the pH is adjusted to about 9.6 by addition of monoethanolamime.

8. A composition of claim 3 comprising about 0.3 weight percent ammonium nitrate, about 0.5 weight percent cesium nitrate and about 13 weight percent fumed silica, wherein the pH is adjusted to about 9.6 by addition of monoethanolamime.

9. A composition of claim 3 comprising about 0.95 weight percent cesium nitrate, about 500 ppm 1,2propanediol and about 13 weight percent fumed silica, wherein the pH is adjusted to about 9.6 by addition of monoethanolamime.

10. A method for polishing a workpiece comprised of silicon dioxide, silicates, or silicon nitride wherein the surface of said workpiece is exposed to a polishing composition comprising; water, submicron $SiO_2$ particles, a soluble inorganic salt at a concentration below the critical coagulation concentration for said composition, wherein the pH of said composition is adjusted to within the range of about 9 to 10 by addition of a soluble amine.

11. A method according to claim 10 wherein said soluble inorganic salt is present at a concentration of about 0.01% to about 1.0%.

12. A method according to claim 11 wherein said soluble inorganic salt contains a cation from the group consisting of $NH_4^+$, $Cs^+$ and $Ba^{2+}$.

13. A method according to claim 10, 11, or 12 wherein said composition is also comprised of a polyhydric alcohol.

14. A method according to claim 13 wherein said polyhydric alcohol is 1,2 propanediol.

15. A method according to claim 12 wherein said composition is comprised of about 0.05 weight percent barium nitrate and about 13 weight percent fumed silica, wherein the pH is adjusted to about 9.6 by addition of monoethanolamime.

16. A method according to claim 12 wherein said composition is comprised of about 0.3 weight percent ammonium nitrate, about 0.05 weight percent barium nitrate and about 13 weight percent fumed silica, wherein the pH is adjusted to about 9.6 by addition of monoethanolamime.

17. A method according to claim 12 wherein said composition is comprised of about 0.3 weight percent ammonium nitrate, about 0.5 weight percent cesium nitrate and about 13 weight percent fumed silica, wherein the pH is adjusted to about 9.6 by addition of monoethanolamime.

18. A method according to claim 12 wherein said composition is comprised of about 0.95 weight percent cesium nitrate, about 500 ppm 1,2-propanediol and about 13 weight percent fumed silica, wherein the pH is adjusted to about 9.6 by addition of monoethanolamime.

* * * * *